April 1, 1958 R. J. ALLYN 2,829,360
TRANSDUCER MOUNTS
Filed March 29, 1954 7 Sheets-Sheet 1

INVENTOR.
RICHARD J. ALLYN
BY
*George H Fisher*
ATTORNEY

April 1, 1958 R. J. ALLYN 2,829,360
TRANSDUCER MOUNTS
Filed March 29, 1954 7 Sheets-Sheet 2

INVENTOR.
RICHARD J. ALLYN
BY
*George H. Fisher*
ATTORNEY

April 1, 1958  R. J. ALLYN  2,829,360
TRANSDUCER MOUNTS

Filed March 29, 1954   7 Sheets-Sheet 3

INVENTOR.
RICHARD J. ALLYN
BY
*George H Fisher*
ATTORNEY

INVENTOR.
RICHARD J. ALLYN
BY George H. Fisher
ATTORNEY

INVENTOR.
RICHARD J. ALLYN
BY George H. Fisher
ATTORNEY

United States Patent Office 2,829,360
Patented Apr. 1, 1958

2,829,360
TRANSDUCER MOUNTS

Richard J. Allyn, Seattle, Wash., assignor to Minneapolis-Honeywell Regulator Company, Minneapolis, Minn., a corporation of Delaware Application March 29, 1954, Serial No. 419,484

6 Claims. (Cl. 340—8)

This invention relates to the field of sonar, or underwater sound communication, and more specifically to an improved hull unit for use in sonar systems. A principal object of the invention is to provide such a unit which includes a novel simplified mechanical arrangement for adjusting a transducer in azimuth and in elevation, requiring only a single control tube extending from a drive unit within the vessel to a transducer unit in the fluid in which the vessel floats, in which arrangement special provision is made for preventing chafing of the transducer conductors traversing the hollow control tube, by maintaining them under continual tension within the tube through the intermediary of a bow spring in the drive unit.

Various other objects, advantages, and features of novelty which characterize my invention are pointed out with particularity in the claim annexed hereto and forming a part hereof. However, for a better understanding of the invention, its advantages, and objects attained by its use, reference should be had to the subjoined drawing, which forms a further part hereof, and the accompanying descriptive matter in which I have illustrated and described a preferred embodiment of my invention. In the drawing:

Figure 1:
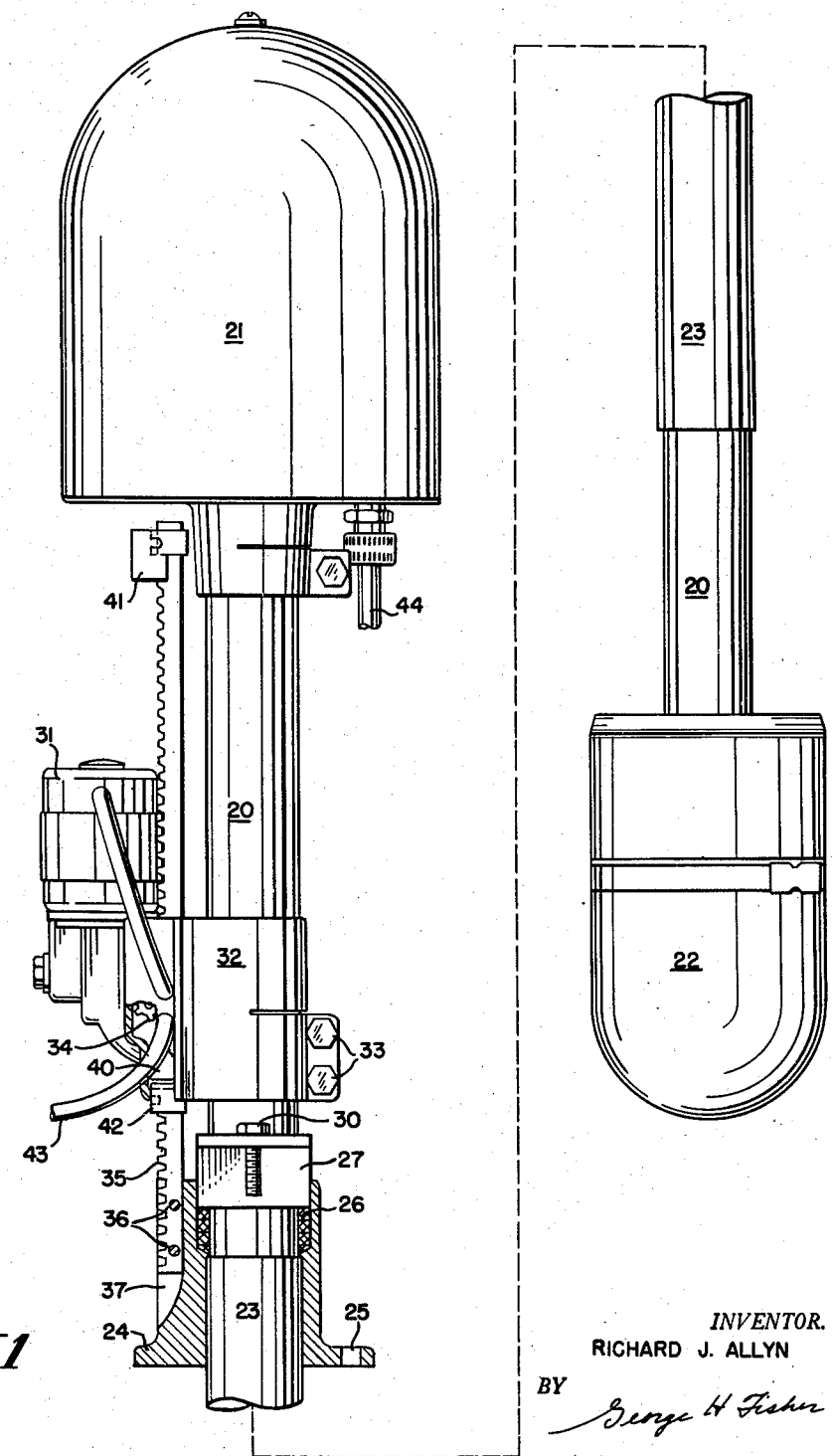
Figure 1 is a general view of a hull unit according to the invention.

Turning first to Figure 1, there is shown at 20 a support tube connected at one end to a drive unit generally indicated by the reference numeral 21 and at the other end to a transducer unit generally indicated by the reference numeral 22. For a considerable portion of its length tube 20 is encased in a guide sheath 23 carrying at its upper end a packing gland 24 adapted to be fastened to the craft by suitable bolts passing through holes 25, with the sheath extending vertically through the hull of the craft and into the water. Leakage between sheath 23 and shaft 20 is prevented by packing material 26 which is compressed by a packing nut 27 when a set of pull-down screws 30 are tightened.

For physical protection of the transducer unit when not in use, and when its principal lobe is directed vertically downward, it is customary to provide an inverted well in the hull of the vessel into which the transducer unit may be retracted. This movement of the unit is accomplished by a motor 31 mounted on a bracket 32 clamped to tube 20 by means including screws 33. The motor housing is broken away to show a pinion 34, coupled by suitable reduction gearing to the motor shaft, which meshes with a rack 35 fastened by pins 36 in a channel 37 in gland 24. Bracket 32 includes conventional limit switch means, one of which is shown at 40, for determining the limits of the travel of tube 20 in sheath 23 under the control of motor 31, and stops 41 and 42 are adjustable along rack 35 to give the desired range of operation of the unit.

Electrical connection is made to motor 31 and to the limit switches through a multiconductor cable 43. A similar cable 44 is provided to make electrical connections to components within drive unit 21.

Figure 7:
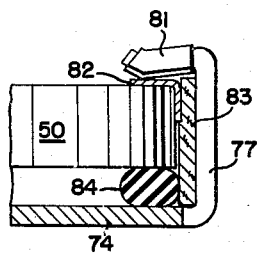
Figures 2–7 show details of the construction of the transducer unit.
Figure 2:
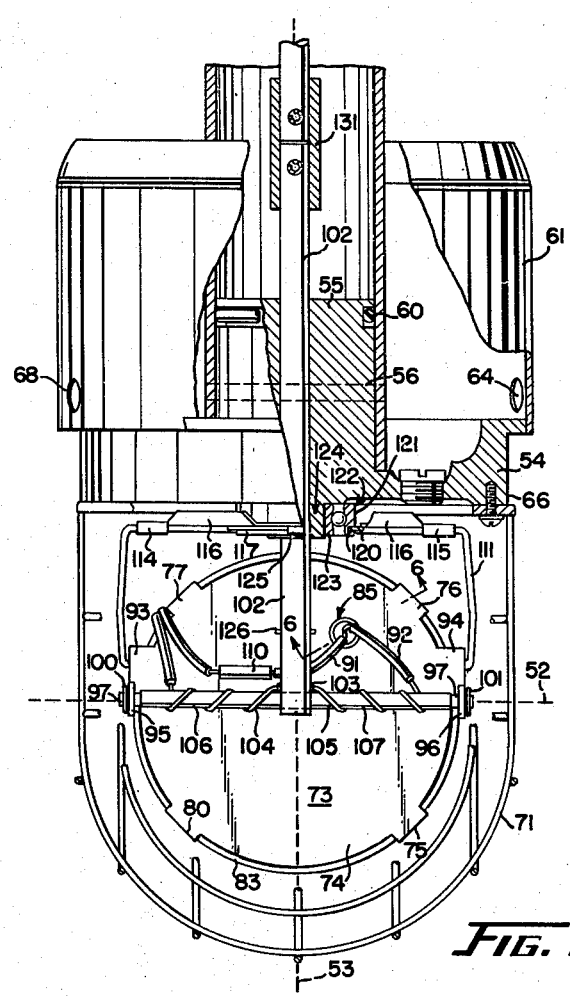
Figure 6:
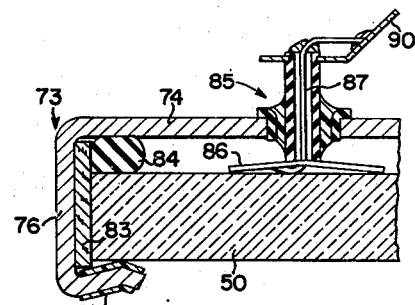
Figure 4:
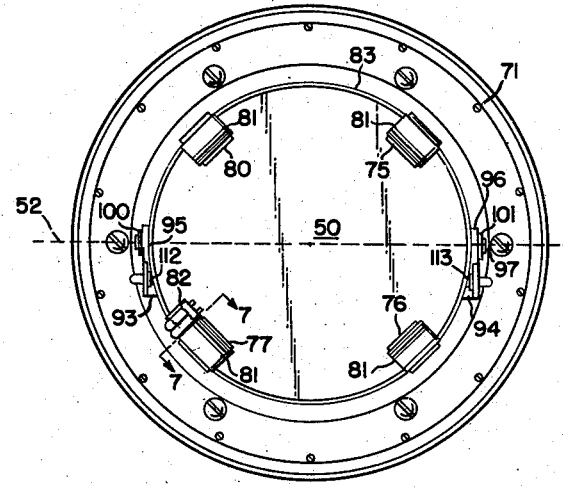
Figure 3:
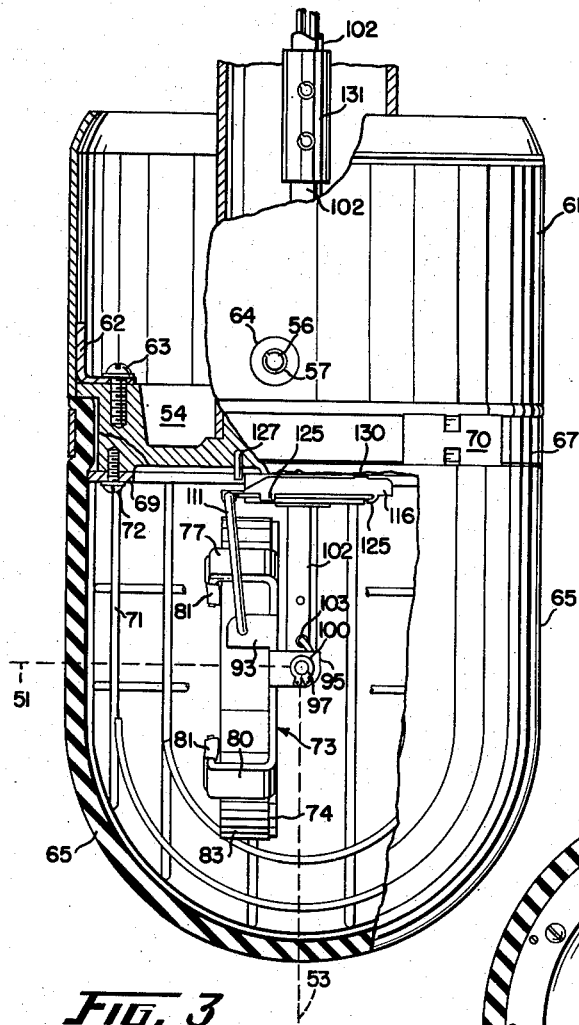
Figure 5:
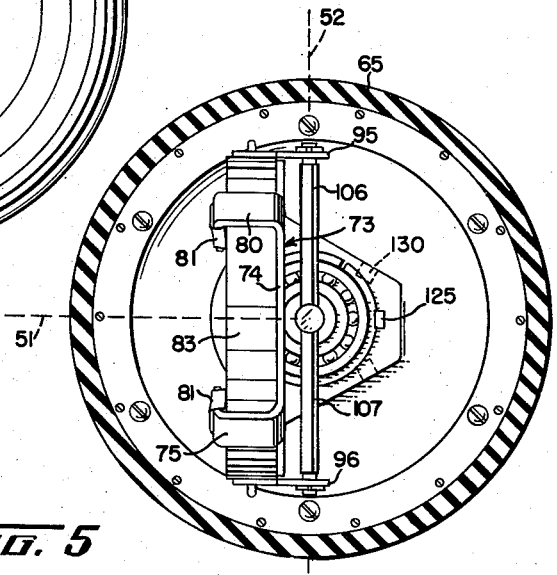

Figures 2 and 3 are elevations of transducer unit 22, parts being broken away for clarity of illustration, and Figures 4 and 5 are bottom views of the same unit, the transducer being tilted in Figure 4 to direct its principal lobe vertically downward. Figures 6 and 7 are fragmentary sections taken along the line 6—6 of Figure 2 and the line 7—7 of Figure 4, respectively. The actual source of the sound energy is a transducer 50 which in the preferred embodiment of my invention is a properly polarized polycrystalline aggregate of barium titanate in the form of a disc. Such a disc, when electrically energized with alternating voltage of a particular frequency, emits sound energy in a directive pattern having a principal lobe whose axis is perpendicular to the disc, as shown at 51, Figures 3 and 5. It is desired that the transducer be mounted adjustably so that the axis 51 may be directed in any direction within the quarter sphere ahead of and below the vessel. To accomplish this, transducer 50 is arranged to tilt through an angle of 90 degrees about a normally horizontal axis 52, and to scan, through plus and minus 90 degrees in azimuth relative to dead-ahead, about normally vertical axis 53.

The unit is assembled about a mount 54 having a hub 55 adapted to be received within tube 20 and held by a cross pin 56. Fluid seal is accomplished by a flexible O-ring 60. Extending upwardly from mount 54 is a guide shell 61 fastened to the mount by brackets 62 and screws 53. Two aligned apertures 64, 68, are provided in shell 61 to facilitate insertion and removal of pin 56.

A boot 65 of sound transparent rubber is clamped to a flange 66 on mount 54 by a metal strap 67, held by a buckle 70. Collapse of boot 53 under the pressure of the surrounding water is prevented by an internal stiffening basket 71, the rim 69 of which is fastened to mount 54 by screws 72.

Inside of basket 71 the transducer 50 is shown as mounted in a holder 73 having a solid back 74 and a plurality of gripping prongs 75, 76, 77 and 80 covered with resilient insulating tubing 81. The front and rear surfaces of transducer 50 are made electrically conducting by any suitable process, as is required for proper electrical energization of the aggregate: electrical connection is made to the front surface of the transducer by a contact 82 gripped under prong 77, as shown in Figures 4 and 7. The transducer is surrounded by a compressible layer of cork 83, and is spaced from the back 74 of holder 73 by a resilient O-ring 84, which is compressed by the action of prongs 75, 76, 77 and 80 to maintain the transducer in firm contact with the prongs and contact 82.

A contact assembly 85 best shown in Figure 6 is sealed to holder 73 but insulated therefrom: within the holder a contact spring 86 engages the rear surface of transducer 50 to make electrical connection therewith, and a bare conductor 87 passes through the hollow contact and is soldered to an external lug 90. Later connection of conductors 91 and 92 to this lug as shown in Figure 6 seals the outer end of the hollow contact with solder: this results in an air chamber within holder 73 behind the transducer, which suppresses the back beam from the transducer because of the relatively poor coupling between the latter and the air.

Holder 73 is further formed to provide a pair of forwardly extending lugs 93 and 94 and a pair of rearwardly extending lugs 95 and 96. Passing through lugs 95 and 96 is a pivot pin 97 held at either end by retaining rings 100 and 101 and passing pivotally through the end of a control tube 102. The latter has openings provided with bushings 103 through which electrical conductors passing through the tube may be brought out at 104 and 105 for making connection with contact 82 and terminal 85. The conductors are wound several times about pin 97 to permit convenient tilting of the transducer about the axis 52 of the pin, and the latter is sheathed with insulating tubing at 106 and 107 to prevent possible short circuits in the event of conductor failure. A resistor 110 is connected between contact 82 and terminal 85.

Control tube 102 passes through hub 55 which acts as a bearing to permit the control tube to rotate about its axis or to move linearly in the direction of its axis.

Lugs 93 and 94 of holder 73 pivotally receive the ends of a link 111, retaining rings 112 and 113 being also provided. The central portion of link 111 passes pivotally through spaced lugs 114 and 115 formed in a floating link support 116. Support 116 rests on a snap ring 117 received in a groove 120 in the outer race 121 of a bearing 122 whose inner race 123 is pressed onto a hollow hub 124 depending from mount 54. Support 116 has lugs 125 which are closed over ring 117 so that the ring, the outer race, and the floating link support form a unitary assembly rotatable about the axis of the bearing, which is concentric with tube 102.

The mechanism just described provides means whereby the transducer may be scanned in azimuth and tilted in elevation. The scan adjustment is brought about by rotation of central tube 102, which rotates pivot pin 97 carrying with it transducer 50, link 111, and support 116. The tilt adjustment is brought about by axial movement of control tube 102, which results in counterclockwise pivoting of holder 73 about the ends of link 111 so that the transducer moves into the position shown in Figure 4. Vertical movement of control tube 102 is limited by a pin 126, Figure 2, projecting from the control tube to engage the inner race of bearing 122. Rotation of control tube 102 is limited by a pin 127, Figure 3, projecting downwardly from mount 54 to engage lugs 130 on support 116.

Two distinct advantages are obtained by the structure just described over more conventional structures using a fixed pivot instead of link 111. The first of these is the possibility of obtaining the desired 90 degree tilt of the transducer within a boot of smaller dimensions. The second advantage is that the use of the pivoted link results in an angular tilt which is much more nearly linear with axial displacement of tube 102 than would be the case if a solid pivot arrangement were used.

Figure 8:
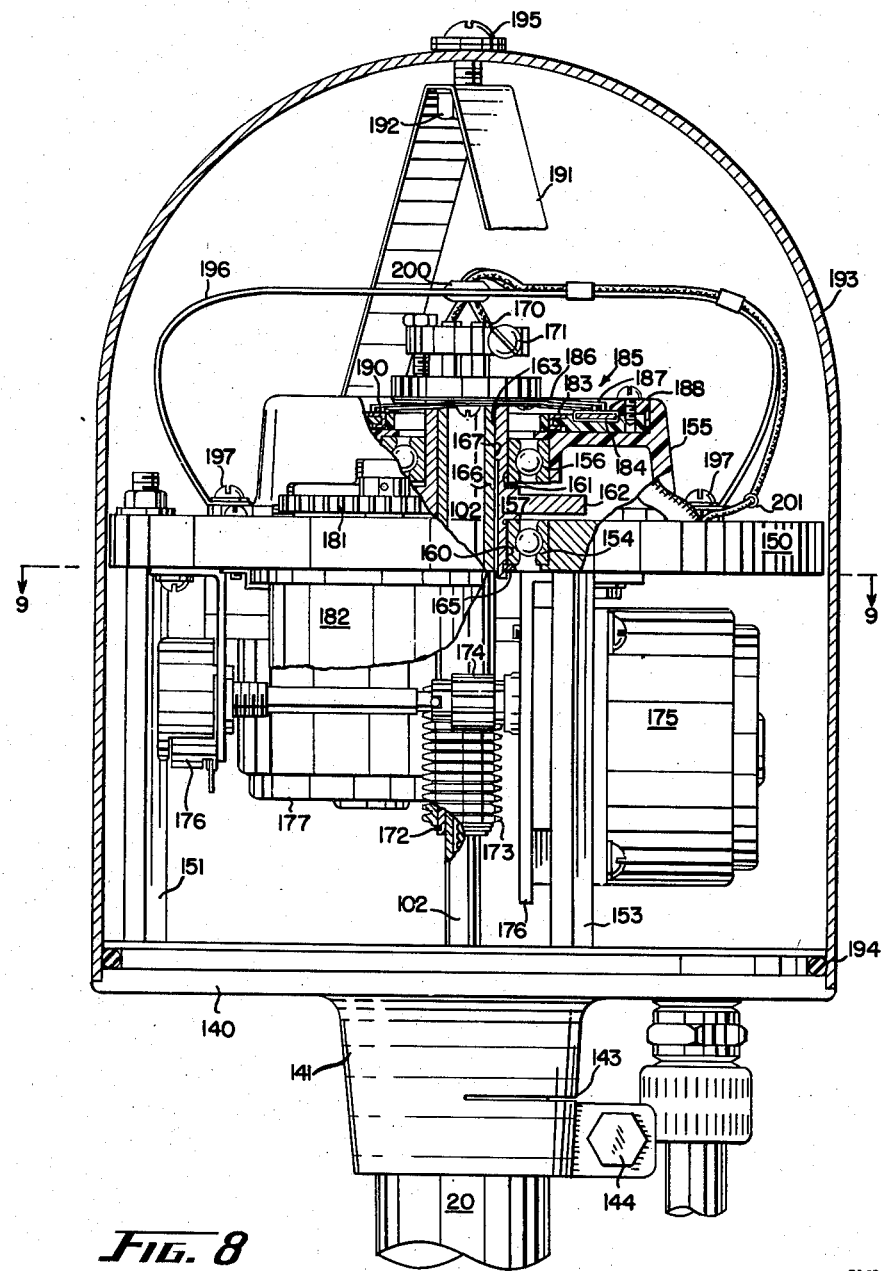
Figures 8–11 show details of the construction of the drive unit.
Figure 9:
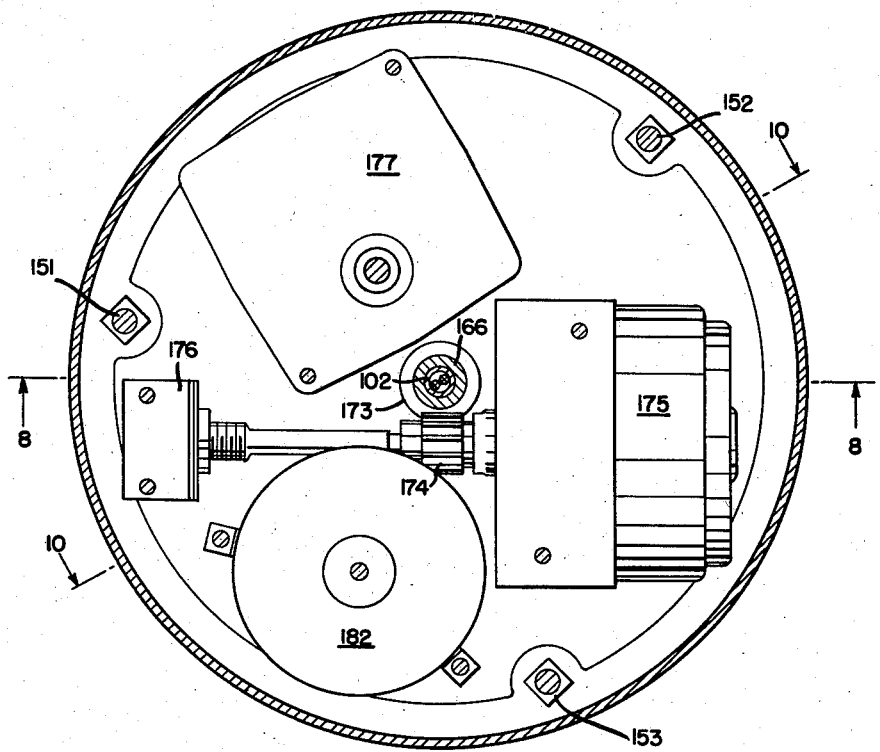
Figure 10:
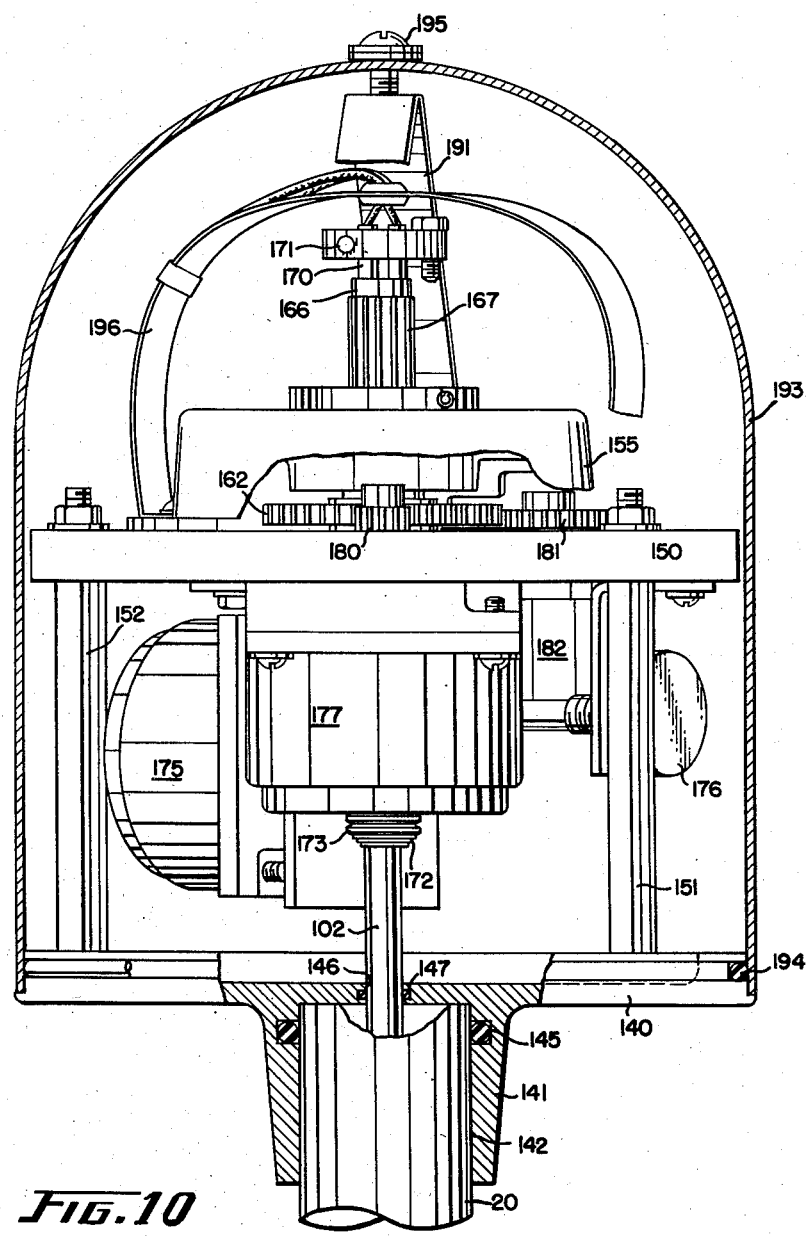
Figure 11:
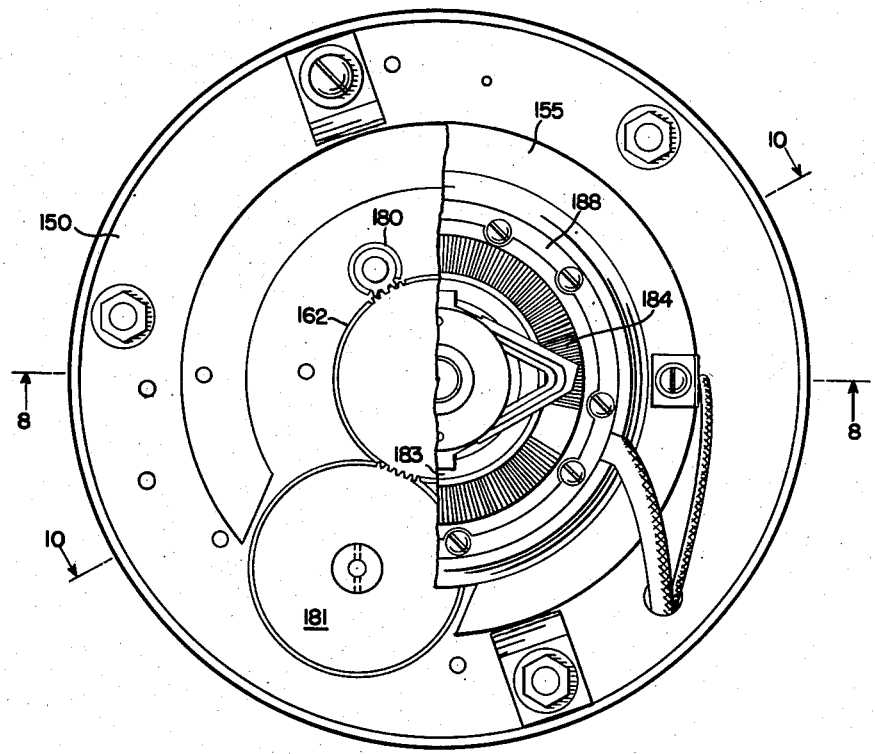

Like support tube 20, control tube 102 extends from transducer unit 22 to drive unit 21, either unitarily or in sections of convenient length joined as by couplings 131. Figures 8 and 10 are elevations of the drive unit, Figure 9 is a sectional plan taken at the line 9—9 of Figure 8, and Figure 11 is a plan. In each case parts have been broken away for purposes of illustration. The directions in which the apparatus is viewed to give the appearance of Figures 8 and 10 are perpendicular respectively to lines 8—8 and 10—10 in Figures 9 and 11.

Drive unit 21 is assembled on a base 140 having a hub 141 bored at 142 to receive tube 20. Hub 141 is split at 143, and a clamping screw 144 secures base 140 to tube 20. Fluid seal is provided by an O-ring 145.

Base 140 is centrally bored at 146 to pass control tube 102, an O-ring 147 being provided here.

The principal components of drive unit 21 are mounted above and below a mount plate 150, spaced from and supported on base 140 by spacers 151, 152 and 153. Plate 150 is centrally bored to receive a pressed-in bearing 154. An upper housing 155 is fastened to plate 150, and is centrally bored to receive a second pressed-in bearing 156. Received in bearings 154 and 156 is a hollow member 157 provided with bearing engaging surfaces 160 and 161, an external gear toothed surface 162, and an internal splined surface 163. Surface 160 is held in bearing 154 by a retaining ring 165 and a shoulder member 157.

When member 157 is rotated it causes rotation of a stub shaft 166 having external splines 167 cooperating with the internal splines in member 157. Control tube 102 passes through stub shaft 166 and is frictionally engaged by the gripping action of a split end 170 of the stub shaft when a clamp screw 171 is tightened. Thus rotation of stub shaft 166 rotates control tube 102 and hence causes azimuth scan of transducer 50.

Near the lower end of stub shaft 166 it is grooved to receive a retaining ring 172, which holds on the shaft a circular rack 173. This rack meshes with a pinion 174 on the shaft of a tilt motor 175 mounted on a bracket 176 fastened to mount plate 150, so that operation of the motor in opposite directions raises and lowers the stub shaft 166 and hence tilts the transducer to the vertical and the horizontal. A voltage divider 176 is connected to the shaft of motor 175 for adjustment concurrently with axial movement of control tube 102 so that it is possible to take a portion of the signal voltage applied to divider 176 proportional to the tilt of transducer 50.

A scan motor 177 is fastened below plate 150, with its shaft extending through the plate and carrying a pinion 180 meshing with the gear toothed surface 162 of member 157. Also meshed therewith is a gear 181 fastened to a shaft which passes downward through plate 150 and adjusts a sine-cosine potentiometer 182 of conventional structure.

The upper surface of upper housing 155 is recessed to received the slip ring 183 and the annular resistance winding 184 of a voltage divider generally given the reference numeral 185. A wiper assembly 186 fastened to member 157 carries sliding contacts 187 engaging winding 184, and sliding contacts 190 engaging ring 185. Resistance winding 184 is fastened to housing 155 by a clamping ring 188.

A bracket 191 fastened to mount plate 150 carries a nut 192. A housing 193 fits over mount plate 150 and base 140, being sealed with respect to the latter by an O-ring 194, and is secured to bracket 191 by a screw 195.

The conductors for energizing transducer 50 pass through control tube 102 to drive unit 21. In ordinary axial movement of drive shaft 166 slack would soon develop in the wires in the tube, followed by rubbing and wear. To avoid this, a bow spring 196 is fastened to upper housing 155 by screws 197. The spring is centrally pierced and provided with an insulating bushing 200. As shown in Figures 8 and 10, the conductors pass through the control tube and are gripped by bushing 200 and are led along bow spring 196 to a cable clamp 201. Thus as stub shaft 166 moves in and out, tension remains in the conductors and no undesired wear can take place.

In order to clarify the drawings a number of wires necessary for operation of the invention in a complete system have been omitted.

The operation of the unit is self-evident from the drawing. When it is desired to change the azimuth of the axis of the transducer lobe, motor 177 is energized to drive pinion 180. This drives member 157, which acts through the splines and the clamped connection to rotate control tube 102, thus adjusting the azimuth of the transducer. When it is desired to tilt the latter, it is brought clear of its well by use of hoist motor 31 if necessary, and then tilt motor 175 is energized to drive pinion 174. This moves stub shaft 166 axially, imparting the same movement to control tube 102, and the elevation angle of the transducer changes accordingly.

Certain aspects of the control system incorporating the present invention are shown in the copending application of Roy H. Malm, Serial No. 398,110, filed December 14, 1953, and assigned to the assignee of the present application.

Numerous objects and advantages of my invention have been set forth in the foregoing description, together

I claim as my invention:

1. Apparatus of the class described comprising, in combination: a device to be positioned angularly in azimuth and elevation; a housing; means mounting said device within said housing for angular movement about a normally vertical axis and a normally horizontal axis; a driving member; means supporting said member in said housing for rotation about an translation along one of said axes; coupling means connecting said member to said device so that rotation of said member causes rotation of said device about said one axis; means in said coupling means further connecting said member to said device so that translation of said member causes rotation of said device about the other of said axes; a tilt motor and a scan motor; gear means connecting said scan motor to said member for causing rotation of said member regardless of the translation thereof; and further gear means, including a cylindrical rack, connecting said tilt motor to said member for causing translation of said member regardless of the rotation thereof.

2. In a device of the class described, in combination: a transducer having a directivity pattern with a principal lobe; a housing; means mounting said transducer for angular movement, within said housing, about a normally horizontal axis and a normally vertical axis, so that said lobe may be given any direction within the range of movement of said transducer about said axes; an elongated driving member; means mounting said member for rotation about and translation along one of said axes; coupling means connecting said member to said transducer so that rotation of said member causes rotation of said transducer about said one axis; means in said coupling means further connecting said member to said transducer so that translation of said member causes rotation of said transducer about the other of said axes; and means connected to said member remotely from said support for causing rotation and translation of said member in accordance with the desired direction of the principal lobe of said transducer.

3. Apparatus of the class described comprising, in combination: a support tube; a transducer unit fastened to one end of said tube; a drive unit fastened to the other end of said tube; a control tube extending axially through said support tube between said drive unit and said transducer unit; means supporting said control tube in said transducer unit for rotation about and translation along its axis; a transducer in said transducer unit having a directivity pattern with a principal lobe; means pivotally mounting said transducer on said control tube for rotation about a second axis normal to the axis of said tube, and for rotation with said tube about the axis thereof; a link support mounted in said transducer unit for rotation about the axis of said control tube; means preventing movement of said support in the direction of the axis of said control tube; link means connecting said transducer and said support, so that upon translation of said control tube along its axis, said transducer is caused to rotate about said second axis; means in said drive unit connected to said control tube for causing rotation and translation thereof; electrical conductors connected to said transducer and traversing said control tube; and means in said drive unit, including a bow spring, for maintaining said conductors under tension in said control tube regardless of axial movement of said tube.

4. Apparatus of the class described comprising, in combination: a support tube; a transducer unit fastened to one end of said tube; a drive unit fastened to the other end of said tube; a hollow stub shaft in said drive unit; means in said drive unit for causing rotation of said stub shaft about its axis and translation of said stub shaft along its axis; a control tube extending axially through said support tube between said drive unit and said transducer unit; means connecting one end of said control tube to said stub shaft for movement unitary therewith; a transducer in said transducer unit having a directivity pattern with a principal lobe; means in said transducer unit connected to said transducer and said control tube for causing rotation of said transducer about a first axis upon rotation of said control tube and about a second axis upon translation of said control tube; electrical conductors connected to said transducer and traversing said control tube; and means in said drive unit, including a bow spring, for maintaining said conductors under tension in said control tube regardless of axial movement thereof.

5. Apparatus of the class described comprising, in combination: a support tube, a transducer unit fastened to one end of said tube; a drive unit fastened to the other end of said tube; a hollow stub shaft in said drive unit; means in said drive unit for causing rotation of said stub shaft about its axis, and for causing translation of said drive shaft along its axis; a control tube extending axially through said support tube between said drive unit and said transducer unit; means connecting one end of said control tube to said drive tube for movement unitary therewith; means supporting said control tube in said transducer unit for rotation about and translation along its axis; a transducer in said transducer unit having a directivity pattern with a principal lobe; means pivotally mounting said transducer on said control tube for rotation about a second axis normal to the axis of said tube, and for rotation with said tube about the axis thereof; a link support mounted in said transducer unit for rotation about the axis of said control tube; means preventing movement of said support in the direction of the axis of said control tube; link means connecting said transducer and said support, so that upon translation of said control tube along its axis said transducer is caused to rotate about said second axis; electrical conductors connected to said transducer and traversing said control tube; and means in said drive unit, including a bow spring, for maintaining said conductors under tension in said control tube regardless of axial movement of said tube.

6. Apparatus of the class described comprising, in combination: a support tube; a transducer unit fastened to one end of said tube; a drive unit fastened to the other end of said tube; a control tube extending axially through said support tube between said drive unit and said transducer unit; means supporting said control tube in said transducer unit for rotation about and translation along its axis; a transducer in said transducer unit having a directivity pattern with a principal lobe; means pivotally mounting said transducer on said control tube for rotation about a second axis normal to the axis of said tube, and for rotation with said tube about the axis thereof; a link support mounted in said transducer unit for rotation about the axis of said control tube; means preventing movement of said support in the direction of the axis of said control tube; link means connecting said transducer and said support, so that upon translation of said control tube along its axis, said transducer is caused to rotate about said second axis; and means in said drive unit connected to said control tube for causing rotation and translation thereof.

References Cited in the file of this patent
UNITED STATES PATENTS

| | | |
|---|---|---|
| 2,396,722 | Russell | Mar. 19, 1946 |
| 2,407,697 | Williams | Sept. 17, 1946 |
| 2,420,676 | Peterson | May 20, 1947 |
| 2,426,657 | Williams | Sept. 2, 1947 |